United States Patent
Argumedo et al.

(10) Patent No.: US 8,027,121 B2
(45) Date of Patent: Sep. 27, 2011

(54) POSITIONING COARSE SERVO ACTUATOR OF TAPE SERVO SYSTEM TO ALLOW FINE SERVO ACTUATOR TO FOLLOW TAPE SHIFT EXCURSIONS

(75) Inventors: Armando Jesus Argumedo, Tucson, AZ (US); Nhan Xuan Bui, Tucson, AZ (US); Reed Alan Hancock, Tucson, AZ (US); Roger Javier Justo, Tucson, AZ (US); Angeliki Pantazi, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 12/612,403

(22) Filed: Nov. 4, 2009

(65) Prior Publication Data

US 2011/0102937 A1 May 5, 2011

(51) Int. Cl.
*G11B 5/584* (2006.01)
(52) U.S. Cl. .................................................. 360/77.12
(58) Field of Classification Search .................. None
See application file for complete search history.

(56) References Cited

U.S. PATENT DOCUMENTS

| | | | | |
|---|---|---|---|---|
| 5,343,341 A * | 8/1994 | Jahren | ......................... | 360/77.12 |
| 5,379,170 A | 1/1995 | Schwarz | ....................... | 360/109 |
| 5,661,616 A * | 8/1997 | Tran et al. | ................... | 360/77.12 |
| 5,901,008 A | 5/1999 | Nayak et al. | ................ | 360/78.02 |
| 6,580,581 B1 | 6/2003 | Bui et al. | .................... | 360/78.02 |
| 6,587,303 B1 | 7/2003 | Bui et al. | .................... | 360/78.12 |
| 6,721,126 B1 | 4/2004 | Bui et al. | .................... | 360/78.12 |
| 6,768,608 B2 * | 7/2004 | Saliba et al. | ................ | 360/77.03 |
| 6,801,383 B2 * | 10/2004 | Zweighaft et al. | .......... | 360/77.12 |
| 6,963,467 B2 | 11/2005 | Bui et al. | .................... | 360/77.12 |
| 7,102,845 B2 * | 9/2006 | Saliba et al. | ................ | 360/77.12 |
| 7,110,210 B2 * | 9/2006 | Saliba et al. | ................ | 360/77.12 |
| 7,706,101 B2 * | 4/2010 | Vanderheyden | ........... | 360/78.12 |
| 2006/0126215 A1 | 6/2006 | Bui et al. | .................... | 360/77.12 |

* cited by examiner

*Primary Examiner* — Hoa T Nguyen
*Assistant Examiner* — James L Habermehl
(74) *Attorney, Agent, or Firm* — John H. Holcombe (57) ABSTRACT

Methods, servo systems, and data storage drives follow the lateral shift excursions of longitudinal tape, for example, from flangeless tape guides. A servo sensor is configured to sense lateral position of a tape head with respect to longitudinal servo tracks of the tape, a fine actuator is configured to translate the head laterally, and a coarse actuator is configured to translate the fine actuator laterally. Position error is determined between the head and a desired position related to the servo track, and the fine actuator operated to translate the head laterally to reduce the position error. In the embodiment, lateral shift excursion is sensed from the position error, and the coarse actuator is positioned substantially at a midpoint of the lateral shift excursion. Thus, the fine actuator follows the lateral shift excursions, while the coarse actuator remains at the midpoint.

25 Claims, 6 Drawing Sheets

POSITIONING COARSE SERVO ACTUATOR OF TAPE SERVO SYSTEM TO ALLOW FINE SERVO ACTUATOR TO FOLLOW TAPE SHIFT EXCURSIONS

DOCUMENTS INCORPORATED BY REFERENCE

Commonly assigned U.S. Pat. No. 6,587,303, is incorporated for its showing of a servo system for positioning a tape head laterally.

FIELD OF THE INVENTION

This invention relates to servo systems for longitudinal tape moved in a longitudinal direction, and more particularly to track following servo systems for following longitudinal servo tracks defined on the longitudinal tape as the tape shifts in a lateral direction.

BACKGROUND OF THE INVENTION

The function of a servo system for longitudinal tape, such as magnetic tape, is to move a head laterally of the longitudinal tape to accurately follow the lateral movement of the tape, for example, during read/write operations of the head. If done accurately, the data tracks are written and read in straight lines along the longitudinal tape as the tape is moved in the longitudinal direction. With respect to magnetic tape, the data comprises parallel stripes in the longitudinal direction of the magnetic tape. Servo tracks are prerecorded in the magnetic tape parallel to, and offset from, the expected data stripes. Typically, the lateral movement of the magnetic tape is constrained by flanges present on tape guides at either side of the head, such that the servo system causes the head to follow the data stripes in the presence of disturbances mainly created from limited lateral motion of the tape, called LTM (Lateral Tape Motion).

Servo systems often employ compound actuators to move the head laterally both for track following, and to shift from one servo track (or set of servo tracks) to another and to follow a different set of data stripes. A compound actuator, which comprises a coarse actuator and a fine actuator mounted on the coarse actuator, provides both a large working dynamic range and high bandwidth. The high bandwidth fine actuator typically has a limited range of travel to attain the high bandwidth, and, in the typical track following arrangement, with the fine actuator as the master and the coarse actuator as a slave to the movement of the fine actuator, if the fine actuator drifts to one side as the tape moves laterally, the coarse actuator follows (at a slower rate) the centerline of the movement of the fine actuator. This action is discussed in the incorporated '303 patent.

The flanges of the tape guides, such as rollers, limit the lateral motion of the tape, but may tend to flex the tape and to introduce debris accumulation of the flanges that impact the lifetime of the tape and in addition create undesirable dynamic effects.

Flangeless tape guides tend to solve the problems of the flanged tape guides, but, without being constrained, the longitudinal tape tends to rapidly shift from one side of the tape guides to the other, and to run at one side of the guides for only a short period. Thus, in an attempt to follow the tape from one side to the other, the coarse actuator, in following the centerline of the movement of the fine actuator, is required to move from side to side as the tape rapidly shifts. This motion tends to wear and shorten the life of the coarse actuator, and is a use of power by the coarse actuator.

SUMMARY OF THE INVENTION

Methods, servo systems, and data storage drives are configured to follow the lateral shift excursion of the longitudinal tape.

In one embodiment, a servo system for positioning a head laterally to follow lateral motion of a longitudinal tape having at least one longitudinal defined servo track comprises a servo sensor configured to sense lateral position of the head with respect to defined servo tracks, a fine actuator configured to translate the head laterally with respect to the longitudinal tape, a coarse actuator configured to translate the fine actuator laterally with respect to the longitudinal tape, and a position error signal loop configured to sense the servo sensor. The servo system determines position error between the head and a desired position related to the defined servo track, and operates the fine actuator to translate the head laterally in a manner to reduce the determined position error.

In the embodiment, the servo system senses from the position error signal loop, lateral shift excursion of the defined servo track; and operates the coarse actuator to position the coarse actuator substantially at a midpoint of the lateral shift excursion of the defined servo track.

In a further embodiment, the sensing step comprises sensing current signals employed by the position error signal loop in operating the fine actuator to translate the head laterally, to sense the lateral shift excursion of the defined servo track.

In another embodiment, the sensing step comprises sensing an integration function of the position error signal employed by the position error signal loop in operating the fine actuator to translate the head laterally.

In still another embodiment, wherein the tape is guided with respect to the head with flangeless tape guides such that the lateral shift excursion is greater than a unidirectional stroke of the fine actuator, the coarse actuator operating step comprises operating the coarse actuator to position the coarse actuator such that the fine actuator is capable of reaching both sides of the lateral shift excursion of the defined servo track.

In another embodiment, the servo system determines lateral shift excursion of the longitudinal tape with respect to the head; determines from the determined lateral shift excursion, a midpoint location of the determined lateral shift excursion of the longitudinal tape; and operates the coarse actuator to position the coarse actuator substantially at the midpoint location.

In a further embodiment, the determined midpoint location of the determined lateral shift excursion of the longitudinal tape is stored and associated with an identification of the longitudinal tape. Thus, the determined midpoint location may be used for initial positioning of the head when the tape is again loaded.

In another embodiment, the servo system determines a maximum positive value of the DC component of the position error signal; determines a maximum negative value of the DC component of the position error signal; and determines a midpoint location of the coarse actuator where the maximum positive value of the DC component and the maximum negative value of the DC component are substantially equal.

In a further embodiment, the servo system maintains the coarse actuator at substantially the midpoint location, and operates the position error signal loop and the fine actuator to reduce the position error signal loop determined position error.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
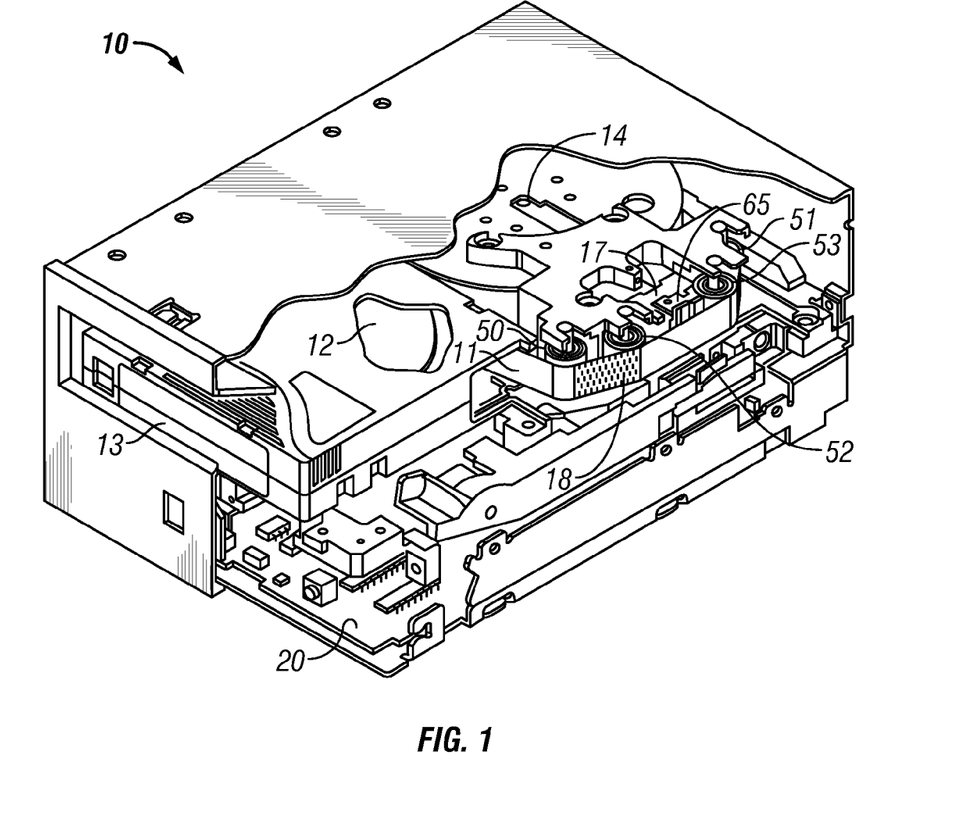
FIG. 1 is a partially cut away view of an exemplary magnetic tape data storage drive which may implement aspects of the present invention.
Figure 2:
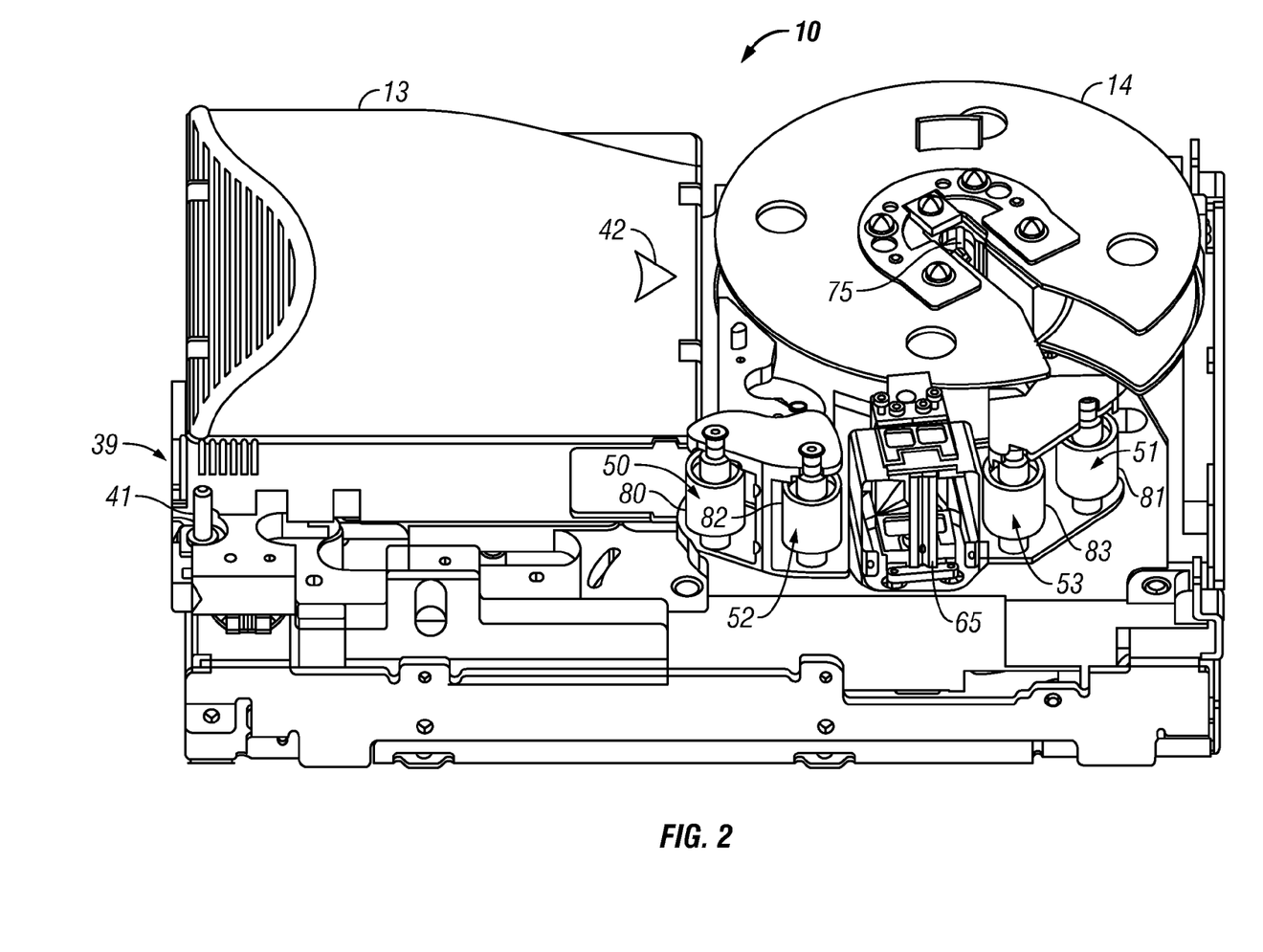
FIG. 2 is a view of the data storage drive of FIG. 1 with the cover removed.

FIGS. 1 and 2 illustrate a magnetic tape data storage drive 10 which writes data 18 to and reads data from longitudinal tape comprising magnetic tape data storage media 11. As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take up reel 14. An example of a magnetic tape drive is the IBM® LTO (Linear Tape Open) magnetic tape drive. Another example of a magnetic tape drive is the IBM® TotalStorage Enterprise magnetic tape drive. Both the above examples of magnetic tape drives employ single reel tape cartridges 13. An alternative magnetic tape drive and magnetic tape cartridge is a dual reel cartridge and drive in which both reels 12 and 14 are contained in the cartridge.

The magnetic tape media 11 is moved in the longitudinal direction across a tape head 65. The tape head may be supported and laterally moved by a compound actuator 17 of a track following servo system. The magnetic tape media is supported by roller tape guides 50, 51, 52, 53, which are flangeless, while the magnetic tape media is moved longitudinally.

A typical magnetic tape data storage drive operates in both the forward and reverse directions to read and write data. Thus, the magnetic tape head 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions.

The magnetic tape data storage drive 10 comprises one or more controls 20 for operating the magnetic tape data storage drive in accordance with commands received from an external system. The external system may comprise a network, a host system, a data storage library or automation system, a data storage subsystem, etc., as is known to those of skill in the art. A control typically comprises logic and/or one or more microprocessors with a memory 19 for storing information and program information for operating the microprocessor(s) and drive. The program information may be supplied to the memory via the interface 21, by an input to the control 20 such as a floppy or optical disk, or by reading from a magnetic tape cartridge, or by any other suitable means. The magnetic tape data storage drive 10 may comprise a standalone unit or comprise a part of a tape library or other subsystem, which may comprise the external system. The control 20 also provides the data flow and formatter for data to be read from and written to the magnetic tape media, as is known to those of skill in the art.

A cartridge receiver 39 is configured to receive a magnetic tape cartridge 13 oriented in a single direction, and to align the magnetic tape cartridge, for example, with guide pin 41, with respect to the cartridge receiver. The proper orientation may be illustrated on the cartridge itself, for example, by arrow 42 on the cartridge. The proper orientation may be enforced by the specific shape of the cartridge or by means of various notches that interact with the receiver, as is known to those of skill in the art. The orientation of the magnetic tape cartridge is such that the magnetic tape 11 exits the cartridge at a specified point of the cartridge receiver. A tape threading mechanism may move the free end of the magnetic tape 11 from the magnetic tape cartridge 13 to a take up reel 14, for example, positioning the free end leader block at the central axis 75 of the take up reel. The magnetic tape is thus positioned along the tape path.

In the illustrated embodiment, flangeless tape guide rollers 50, 51, 52 and 53 each has a cylindrical surface 80, 81, 82, 83 oriented to provide a tape path for the magnetic tape 11 across the magnetic tape head 65.

The tape path comprises at least one flangeless tape guide roller 50 positioned between the magnetic tape cartridge 13 and magnetic tape head 65, and may comprise at least one flangeless tape guide roller 50, 51 at either side of the magnetic tape head 65. Additional tape guide rollers or other types of guides may be provided depending on the length and/or complexity of the tape path, and preferably comprise flangeless tape guide rollers, such as tape guide rollers 52 and 53.

Figure 3:
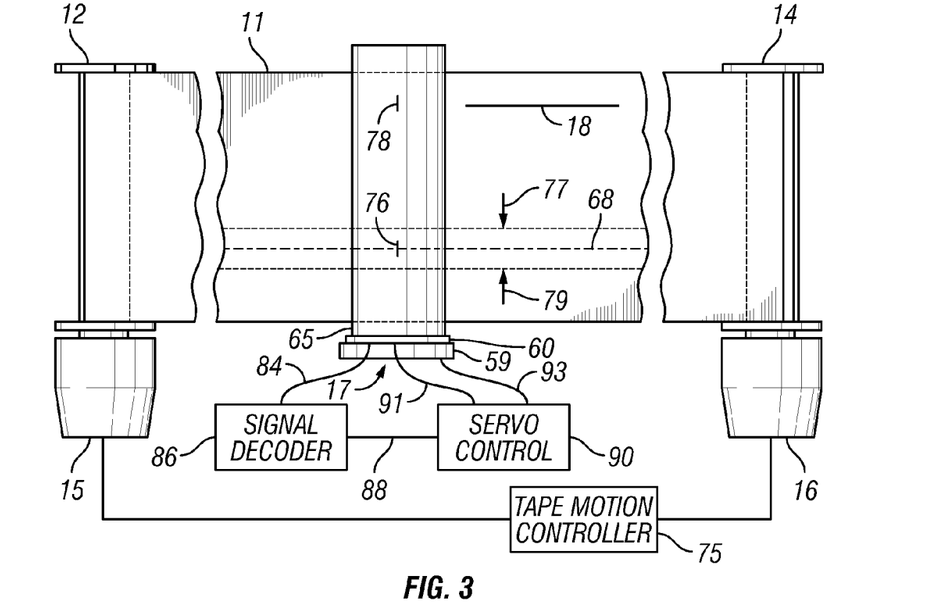
FIG. 3 is a diagrammatic view of the longitudinal tape, tape head and servo system of FIG. 1.

Referring to FIG. 3, as is known to those of skill in the art, flangeless tape guides, such as rollers 50, 51, 52 and 53 of FIG. 2, tend to solve the problems of flanged tape guides, but, as the longitudinal tape 11 is moved longitudinally across the magnetic tape head 65, without being constrained, the tape tends to rapidly shift from one side of the tape head to the other, and to run at one side of the tape head for only a short period.

Still referring to FIG. 3, the longitudinal tape 11 is moved across the tape head 65 between reels 12 and 14 (the tape guide rollers are not shown) by reel motors 15 and 16 under the control of a tape motion controller 75 of control 20 of FIG. 1. The reel motors are operated at various speeds as controlled by the tape motion controller to insure that the magnetic tape media leaves one reel at the same speed that it is wound onto the other reel. The tape motion controller also controls the torque applied to each drive motor 15 and 16 to control the tension applied to the magnetic tape media at the tape head 65.

The magnetic tape head 65 comprises a servo read head or sensor 76 that senses a servo pattern recorded in a servo track 68 of the tape 11. The servo read head may comprise a plurality of servo read sensors at various positions of the magnetic head 65, and the servo track 68 may comprise a number of parallel servo tracks at various positions across the tape 11. As is understood by those of skill in the art, the servo tracks typically extend in the longitudinal direction the full length of the tape, and are prerecorded and defined as a part of the manufacturing process of the tape cartridge 13. A data head 78, which may comprise several data read/write transducers, is shown positioned over a data track region 18 of the tape, for example, containing a plurality of parallel data tracks. As is understood by those of skill in the art, typically, the defined servo tracks of magnetic tape systems are parallel to and offset from the data tracks. The servo track 68 is illustrated as a single line, for example a centerline of a servo track that is wide enough to allow a single servo track or set of tracks to allow servoing of various sets of data tracks by offsetting the servo head from the centerline.

As the tape 11 is moved longitudinally along the tape path, the servo read head 76 reads the servo signals which are provided on a servo signal line 84 to a servo decoder 86. The servo decoder processes the received servo signals and generates a position signal that is provided on a position signal line 88 to a servo control 90. The servo control 90 responds to seek signals to cause the compound actuator 17 to move between servo tracks, and responds to the position signals to cause the actuator 17 to follow the desired servo track.

As discussed above, as the longitudinal tape 11 is moved longitudinally across the magnetic tape head 65, the tape tends to rapidly shift from one side of the tape head to the other, and to run at one side of the tape head for only a short period. The shifting of the tape 11 results in shifting the servo track 68 in the lateral direction, illustrated in FIG. 3 as shifting between lateral shift extreme 77 and lateral shift extreme 79, comprising lateral shift excursions between the extremes.

Figure 4:
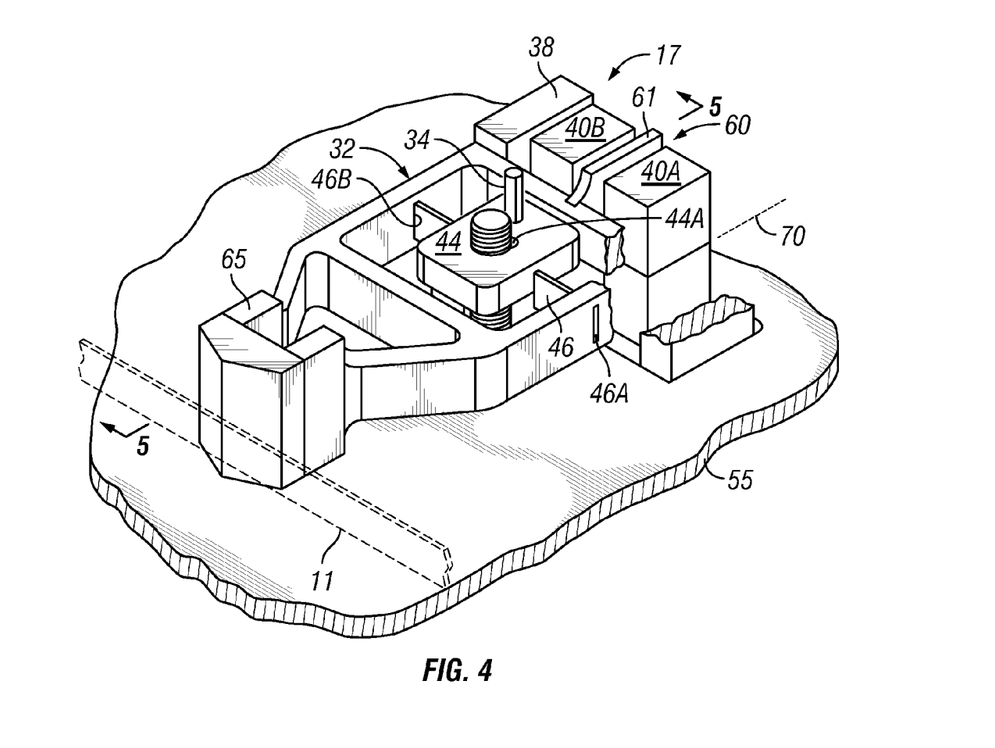
FIG. 4 is a view of a magnetic tape head and compound actuator of the data storage drive of FIG. 1.
Figure 5:
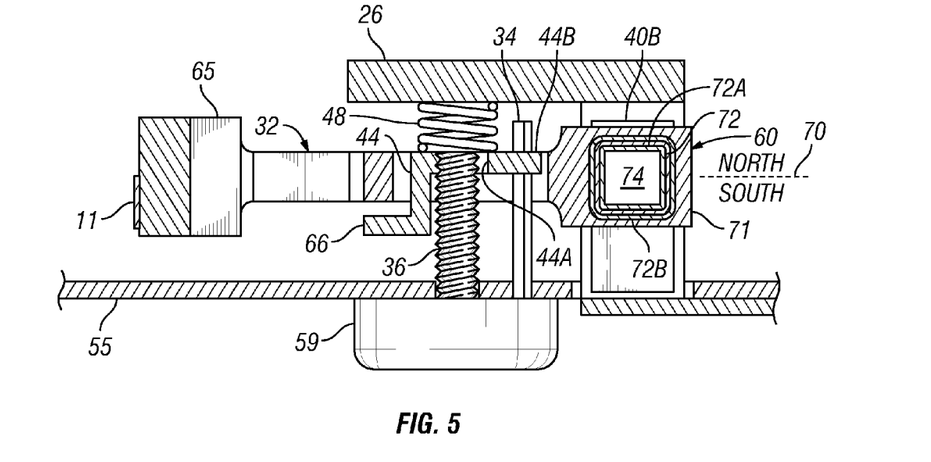
FIG. 5 is a partially cutaway side view of the magnetic tape head and compound actuator of FIG. 4.

Referring to FIGS. 3, 4 and 5, an embodiment of the compound actuator 17 is illustrated. The actuator 17 comprises an actuator arm 32 mounting the magnetic tape head 65. A coarse actuator motor 59 drives a lead screw 36 to move fine actuator stage 44 at an aperture 44A in a vertical direction perpendicular to a base 55. An aperture 44B is provided to receive an anti-rotation pin 34, and a load spring 48 is provided between a housing 26 and the stage 44. A torsion spring 46 is fixed to the stage 44 and is coupled at its ends 46A and 46B to the actuator arm 32 so that the stage 44 moves the head 65 mounted on the actuator arm 32 in a vertical direction across the tape.

A fine actuator coil assembly 60 is attached to an end of the actuator arm 32. The coil assembly 60 comprises a coil frame 71, a coil 72, and a mandrel 74. The coil 62 has an upper portion 72A and a lower portion 72B, and is disposed between magnets 40A and 40B held in a magnet housing 38 which are arranged to split the north and south poles at approximately the line 70. The coil moves vertically upon application of a current at the coil 72 and causes the actuator arm 32 to pivot about torsion spring 46 and move the tape head 65 transversely of the tape 11 to make small adjustments such as in track following mode.

The servo control 90 responds to the position signals to generate servo control signals on line 91 to operate the fine actuator 60 to follow the desired servo track, and when the fine actuator movement is insufficient to accommodate the full move, or a large move is required for other purposes, the servo control 90 generates servo control signals on line 93 to cause the coarse actuator 59 to move the fine actuator is the desired direction.

Alternative compound actuators are known to those of skill in the art, all having both a fine actuator providing high bandwidth, but with a limited range of travel, and a coarse actuator providing a large working dynamic range.

Figure 6:
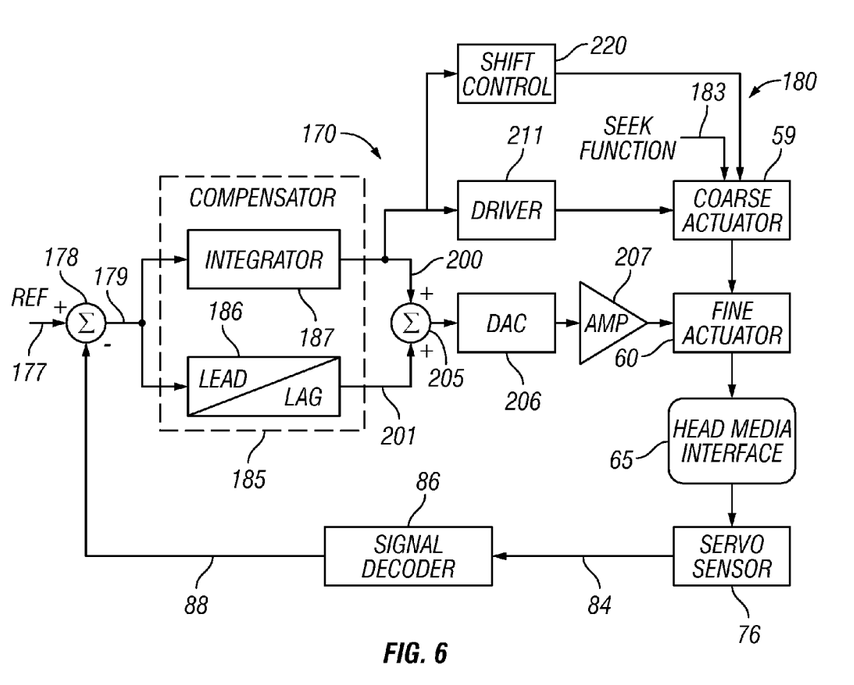
FIG. 6 is a block diagram of an embodiment of the servo system of FIG. 3.

An embodiment of a servo control 90 is illustrated in FIG. 6 as part of a position error signal loop 170 of a servo system 180. The operation of the servo system is discussed in detail in the incorporated '303 patent. Briefly, the servo signals are sensed by servo sensor 76 of head 65, and the position of the servo sensor relative to a servo track is detected from the servo signals by the signal decoder 86. The detected position signals are provided on line 88 and preferably comprise digital signals. The position signals are then compared to a reference signal 177 by a comparator 178 to determine position error between the read and a desired position related to the defined servo tracks, called the position error signal, or "PES", on line 179.

The fine actuator servo typically has a compensator function 185 in the position error signal loop, which is designed to enable maximum bandwidth with adequate stability margins. The compensator function 185 modifies the PES signal by applying a variable gain to the PES signal, which gain is based upon the frequency of the input PES signal 179, or, from another viewpoint, upon the rates of change of the input PES signal.

The compensator function 185 includes an integrator 187 and other transfer function elements, such as a lead/lag functional element 186, to achieve the desired static and dynamic system performance and overall stability. Each element may be implemented as a filter, either an analog filter employing discrete components, or a digital filter, such as an IIR (infinite impulse response) or as a FIR (finite impulse response), or as microcode causing a microprocessor to perform the function.

The integrator 187 provides a response 200 that generally reduces the gain as the frequency increases. The lead/lag element 186 provides a response 201 which is enhanced at high frequencies and reduced at low frequencies. The combined response 205 provides a servo signal to the fine actuator 60 that has both high bandwidth and stability, as is understood by those of skill in the art. A digital to analog converter 206 and power amplifier 207 apply the signal to the fine actuator 60.

The integrator 187 integrates the present signal, approximating the current and therefore the force applied to the fine actuator, with prior signals to determine the DC component of the fine actuator PES. An alternative integration function comprises determining the DC component of the drive current for the fine actuator. The integration function output signal on connection 200 provides an integration control signal to a driver 211, which drives the coarse actuator 59, operating the coarse actuator to translate the fine actuator. If the coarse actuator is a stepper motor, the driver 211 is preferably digital up-down logic and a stepper driver. Thus, if the absolute maximum value of the integration function output signal is larger than the absolute minimum value, the driver 211 operates the stepper motor to step in a direction to center the maximum and minimum values of the integration output signal. A step of the stepper motor may result in a linear translation of the fine actuator, for example, of 3 microns. Alternatively, if the coarse actuator is analog, the driver 211 may convert the digital signal to analog and employ a power amplifier to operate the coarse actuator 59.

The coarse actuator may also be operated by a seek function 183 which moves the fine actuator from one servo track to another.

The output 200 of the integrator is also supplied to a shift control 220 in accordance with the present invention which moves the coarse actuator to a specific location and maintains it at that location.

Referring to FIGS. 6, 7, 8 and 9, as discussed above, flangeless tape guides 50, 51, 52 and 53 of FIG. 2 tend to solve the problems of the flanged tape guides, but, without being constrained, the longitudinal tape 11 tends to rapidly shift from one side of the tape guides to the other, and to run at one side of the guides for only a short period. The motion may exceed the range in one direction of the fine actuator 60 and exceed one or the other of the coarse actuator thresholds. Thus, in an attempt to follow the tape from one side to the other, the coarse actuator 59, in following the centerline of the movement of the fine actuator 60, is required to move from side to side as the tape rapidly shifts. This motion tends to wear and shorten the life of the coarse actuator, and is a use of power by the coarse actuator.

In step 240, a tape is loaded in a tape drive 10 of FIG. 1 and tape motion controller 75 of FIG. 3 operates drive motors 15, 16 to move the tape longitudinally past the head 65. In FIGS. 6, 7, 8 and 9, the servo signal is acquired from servo sensor 76 by signal decoder 86 in step 243.

The servo signal is tracked in step 245, and integrator 187 effectively integrates signals representing the force applied to the fine actuator and, indicates the present position of the servo track with respect to the coarse actuator, for example ultimately reaching "0", as shown by signal 300. Shift control 220, in step 250, determines from the integrator, the DC component of the position error signal. This "0" position is one extreme of the lateral shift of the tape 11, for example position 77 of servo track 68 of FIG. 3.

Figure 7:
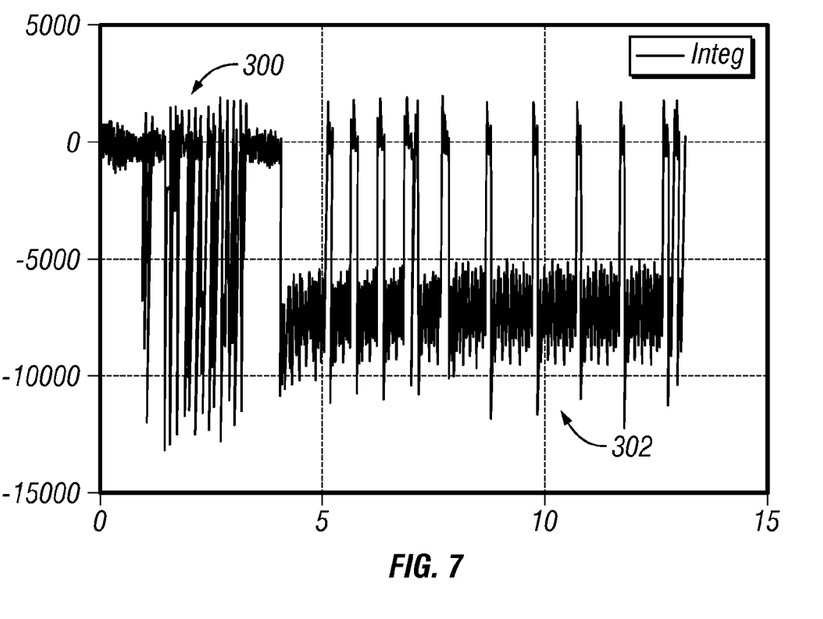
FIGS. 7 and 8 are illustrations of exemplary signals of a compensator of the servo system of FIG. 6.

As the tape shifts the servo track 68 from one lateral shift extreme 77 as shown by signal 300 of FIG. 7 to the opposite lateral shift extreme 79 of FIG. 3, the PES dramatically changes as shown by signal 302 of FIG. 7 and the fine actuator is operated by the servo system to follow the change in PES, possibly exceeding a coarse actuator threshold. Still referring to FIGS. 6, 7, 8 and 9, in step 253, the integrator again indicates the present position of the servo track with respect to the coarse actuator, and determines the DC component of the position error signal, as shown by signal 302, in step 255, the shift control 220 determines from the integrator, the DC component of the position error signal. From the difference between the DC component of step 250 and the present DC component of step 255, the shift control 220, in step 257, determines the lateral shift excursion of the servo track 68 from position 77 to position 79 of FIG. 3 as the result of the lateral shift excursion of the tape 11.

Figure 8:
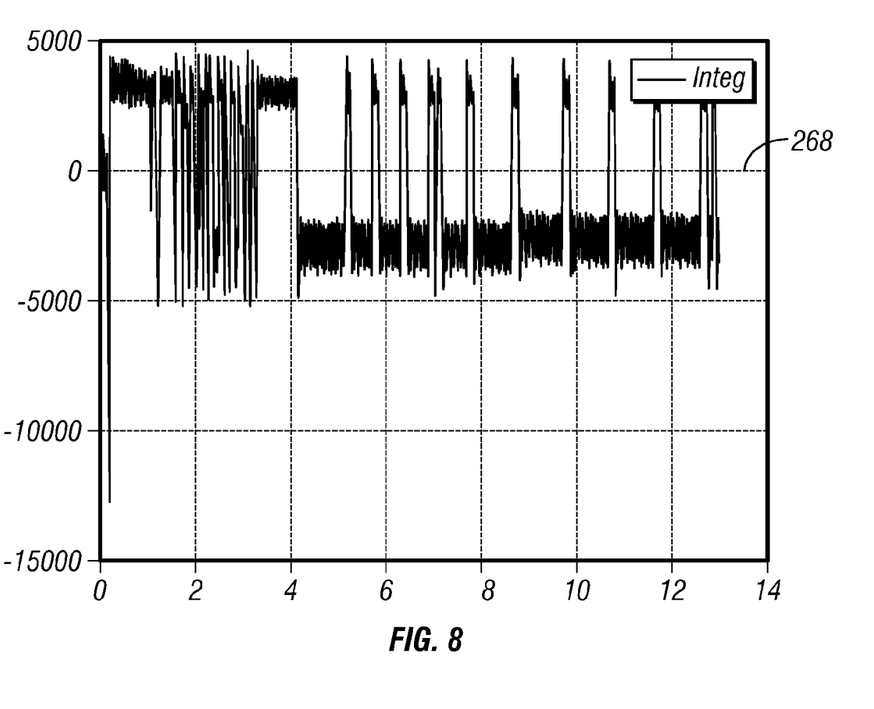

Still referring to FIGS. 6, 7, 8 and 9, in step 260, the shift control 220 determines the midpoint of the lateral shift excursion of the defined servo track, and, in step 265, operates the coarse actuator 59 to shift the coarse actuator and position the coarse actuator substantially at a midpoint 268 of FIG. 8 of the lateral shift excursion of the defined servo track.

Figure 9:
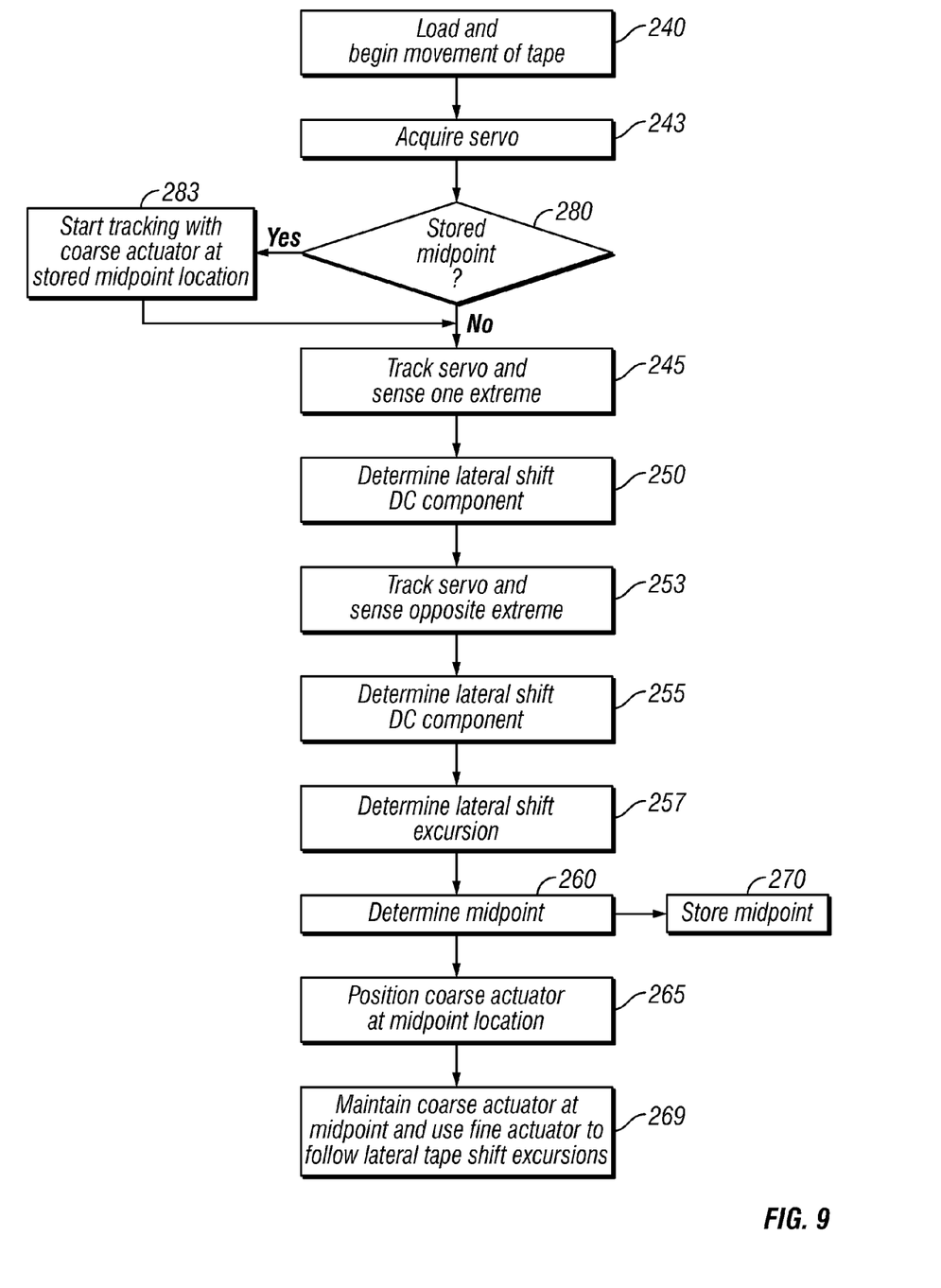
FIG. 9 is a flow chart depicting an embodiment of methods of the present invention.

In step 269, the shift control 220 maintains the coarse actuator at substantially the midpoint location, and operating the position error signal loop and fine actuator to reduce the determined position error. In one example, the shift control maintains the coarse actuator at the midpoint location by altering the positive and negative thresholds of the up-down logic of driver 211 so that the coarse actuator is not activated under normal tracking of the servo track. Thus, only the fine actuator 60 follows the lateral shift excursions, while the coarse actuator remains at the midpoint.

In one embodiment, the determined midpoint location is stored in memory in step 270 of FIG. 9, and the stored midpoint location is associated with an identification of the longitudinal tape. For example, the tape identification comprises the identification of the tape cartridge 13 of FIG. 1. Thus, the next time that the tape cartridge 13 is loaded into the tape drive 10, and the servo acquired in step 243 of FIG. 9, step 280 will indicate that the midpoint has been stored, and step 283 initializes the shift control 220 to initially position the coarse actuator at the location indicated by the stored midpoint location, saving the coarse actuator from substantial activity in the lateral shift discovery process.

The midpoint location may be stored by the servo control 90, the control 20, in a cartridge memory of the cartridge, or at a host system, to be used for future mounts of the tape. The process may also update the stored midpoint location each time the tape is loaded to insure that any changes are tracked.

The implementations may involve software, firmware, micro-code, hardware and/or any combination thereof. The implementation may take the form of code or logic implemented in a medium in control 20, such as memory, storage and/or circuitry where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a servo system for positioning a head laterally to follow lateral motion of a longitudinal tape having at least one longitudinal defined servo track, said servo system comprising a servo sensor configured to sense lateral position of said head with respect to defined servo tracks, a fine actuator configured to translate said head laterally with respect to said longitudinal tape, a coarse actuator configured to translate said fine actuator laterally with respect to said longitudinal tape, and a position error signal loop configured to sense said servo sensor, to determine position error between said head and a desired position related to said at least one defined servo track, and to operate said fine actuator to translate said head laterally in a manner to reduce said determined position error, a method comprising:

sensing from said position error signal loop, lateral shift excursion of said at least one defined servo track, comprising determining a maximum value of said determined position error in a first direction; and determining a maximum value of said determined position error in a second direction opposite said first direction; and operating said coarse actuator to position said coarse actuator substantially at a midpoint of said lateral shift excursion of said at least one defined servo track.

2. The method of claim 1, wherein said sensing step comprises sensing current signals employed by said position error signal loop in operating said fine actuator to translate said head laterally, to sense said lateral shift excursion of said at least one defined servo track.

3. The method of claim 2, wherein said sensing step comprises sensing an integration function of a position error signal employed by said position error signal loop in operating said fine actuator to translate said head laterally.

4. In a servo system for positioning a head laterally to follow lateral motion of a longitudinal tape having at least one longitudinal defined servo track, said servo system comprising a servo sensor configured to sense lateral position of said head with respect to defined servo tracks, a fine actuator configured to translate said head laterally with respect to said longitudinal tape, a coarse actuator configured to translate said fine actuator laterally with respect to said longitudinal tape, and a position error signal loop configured to sense said servo sensor, to determine position error between said head and a desired position related to said at least one defined servo track, and to operate said fine actuator to translate said head laterally in a manner to reduce said determined position error, a method comprising:
  sensing from said position error signal loop, lateral shift excursion of said at least one defined servo track; and
  operating said coarse actuator to position said coarse actuator substantially at a midpoint of said lateral shift excursion of said at least one defined servo track;
  wherein said tape is guided with respect to said head with flangeless tape guides such that said lateral shift excursion is greater than a unidirectional stroke of said fine actuator, and wherein said coarse actuator operating step comprises operating said coarse actuator to position said coarse actuator such that said fine actuator is capable of reaching both sides of said lateral shift excursion of said at least one defined servo track.

5. In a servo system for positioning a head laterally to follow lateral motion of a longitudinal tape having at least one longitudinal defined servo track, said servo system comprising a servo sensor configured to sense lateral position of said head with respect to defined servo tracks, a fine actuator configured to translate said head laterally with respect to said longitudinal tape, a coarse actuator configured to translate said fine actuator laterally with respect to said longitudinal tape, and a position error signal loop configured to sense said servo sensor, to determine position error between said head and a desired position related to said at least one defined servo track, and to operate said fine actuator to translate said head laterally in a manner to reduce said determined position error, a method comprising:
  determining lateral shift excursion of said longitudinal tape with respect to said head;
  determining from said determined lateral shift excursion, a midpoint location of said determined lateral shift excursion of said longitudinal tape; and
  operating said coarse actuator to position said coarse actuator substantially at said midpoint location.

6. The method of claim 5, additionally comprising storing said determined midpoint location of said determined lateral shift excursion of said longitudinal tape; and associating said stored midpoint location with an identification of said longitudinal tape.

7. In a servo system for positioning a head laterally to follow lateral motion of a longitudinal tape having at least one longitudinal defined servo track, said servo system comprising a servo sensor configured to sense lateral position of said head with respect to defined servo tracks, a fine actuator configured to translate said head laterally with respect to said longitudinal tape, a coarse actuator configured to translate said fine actuator laterally with respect to said longitudinal tape, and a position error signal loop configured to sense said servo sensor, to determine position error between said head and a desired position related to said at least one defined servo track, and to operate said fine actuator to translate said head laterally in a manner to reduce said determined position error, said position error signal loop providing a position error signal, said position error signal comprising at least a DC component, a method comprising:
  determining a maximum positive value of said DC component of said position error signal;
  determining a maximum negative value of said DC component of said position error signal; and
  determining a midpoint location of said coarse actuator where said maximum positive value of said DC component and said maximum negative value of said DC component are substantially equal.

8. The method of claim 7, additionally comprising maintaining said coarse actuator at substantially said midpoint location, and operating said position error signal loop and said fine actuator to reduce said position error signal loop determined position error.

9. The method of claim 7, additionally comprising storing said determined midpoint location of said coarse actuator; and associating said stored midpoint location with an identification of said longitudinal tape.

10. A servo system configured to position a head laterally with respect to at least one defined servo track of longitudinal tape, comprising:
  a servo sensor for sensing lateral position of said head with respect to at least one defined servo track of said longitudinal tape;
  a fine actuator configured to translate said head laterally with respect to said longitudinal tape;
  a coarse actuator configured to translate said fine actuator laterally with respect to said longitudinal tape; and
  a servo control configured to sense said servo sensor; to determine position error between said head and a desired position related to said at least one defined servo track; to provide signals to operate said fine actuator to translate said head laterally in a manner to reduce said determined position error; to sense from said provided signals, lateral shift excursion of said at least one defined servo track, comprising to determine a maximum value of said determined position error in a first direction; and determine a maximum value of said determined position error in a direction opposite said first direction; and to operate said coarse actuator to position said coarse actuator substantially at a midpoint of said lateral shift excursion of said at least one defined servo track.

11. The servo system of claim 10, wherein said sensed provided signals comprise current signals to operate said fine actuator to translate said head laterally.

12. The servo system of claim 11, wherein said sensed provided signals comprise an integration function of a position error signal employed to operate said fine actuator to translate said head laterally.

13. A servo system configured to position a head laterally with respect to at least one defined servo track of longitudinal tape, comprising:
  a servo sensor for sensing lateral position of said head with respect to at least one defined servo track of said longitudinal tape;
  a fine actuator configured to translate said head laterally with respect to said longitudinal tape;

a coarse actuator configured to translate said fine actuator laterally with respect to said longitudinal tape; and a servo control configured to sense said servo sensor; to determine position error between said head and a desired position related to said at least one defined servo track; to provide signals to operate said fine actuator to translate said head laterally in a manner to reduce said determined position error; to sense from said provided signals, lateral shift excursion of said at least one defined servo track; and to operate said coarse actuator to position said coarse actuator substantially at a midpoint of said lateral shift excursion of said at least one defined servo track; wherein said tape is guided with respect to said head with flangeless tape guides such that said lateral shift excursion is greater than a unidirectional stroke of said fine actuator, and wherein said servo control is configured to operate said coarse actuator to position said coarse actuator such that said fine actuator is capable of reaching both sides of said lateral shift excursion of said at least one defined servo track.

14. A servo system configured to position a head laterally with respect to at least one defined servo track of longitudinal tape, comprising:

a servo sensor for sensing lateral position of said head with respect to at least one defined servo track;

a fine actuator configured to translate said head laterally with respect to said longitudinal tape;

a coarse actuator configured to translate said fine actuator laterally with respect to said longitudinal tape; and a servo control configured to sense said servo sensor; to determine lateral shift excursion of said longitudinal tape with respect to said head; to determine from said determined lateral shift excursion, a midpoint location of said determined lateral shift excursion of said longitudinal tape; and to operate said coarse actuator to position said coarse actuator substantially at said midpoint location.

15. The servo system of claim 14, additionally configured to store said determined midpoint location of said determined lateral shift excursion of said longitudinal tape; and associate said stored midpoint location with an identification of said longitudinal tape.

16. A servo system configured to position a head laterally with respect to at least one defined servo track of longitudinal tape, comprising:

a servo sensor for sensing lateral position of said head with respect to at least one defined servo track;

a fine actuator configured to translate said head laterally with respect to said longitudinal tape;

a coarse actuator configured to translate said fine actuator laterally with respect to said longitudinal tape; and a servo control configured to determine position error between said head and a desired position related to said at least one defined servo track, said determined position error comprising at least a DC component; to operate said fine actuator to translate said head laterally in a manner to reduce said determined position error; to determine a maximum positive value of said DC component of said position error signal; to determine a maximum negative value of said DC component of said position error signal; and to determine a midpoint location of said coarse actuator where said maximum positive value of said DC component and said maximum negative value of said DC component are substantially equal.

17. The servo system of claim 16, wherein said servo control is additionally configured to maintain said coarse actuator at substantially said midpoint location; and to operate said position error signal loop and said fine actuator to reduce said position error signal loop determined position error.

18. The servo system of claim 16, wherein said servo control is additionally configured to store said determined midpoint location of said coarse actuator; and to associate said stored midpoint location with an identification of said longitudinal tape.

19. A data storage drive comprising:

a head configured to record and read data on a longitudinal tape data storage medium;

a drive configured to move said longitudinal tape data storage medium in the longitudinal direction with respect to said head, said drive comprising at least one flangeless tape guide at either side of said head in said longitudinal direction and configured to position said longitudinal tape data storage medium in proximity with respect to said head; and a servo system configured to position said head laterally with respect to at least one defined servo track of longitudinal tape, comprising:

a servo sensor for sensing lateral position of said head with respect to at least one defined servo track of said longitudinal tape;

a fine actuator configured to translate said head laterally with respect to said longitudinal tape;

a coarse actuator configured to translate said fine actuator laterally with respect to said longitudinal tape; and a servo control configured to sense said servo sensor; to determine position error between said head and a desired position related to said at least one defined servo track; to provide signals to operate said fine actuator to translate said head laterally in a manner to reduce said determined position error; to sense from said provided signals, lateral shift excursion of said at least one defined servo track, comprising to determine a maximum value of said determined position error in a first direction; and determine a maximum value of said determined position error in a direction opposite said first direction; and to operate said coarse actuator to position said coarse actuator substantially at a midpoint of said lateral shift excursion of said at least one defined servo track.

20. A data storage drive comprising:

a head configured to record and read data on a longitudinal tape data storage medium;

a drive configured to move said longitudinal tape data storage medium in the longitudinal direction with respect to said head, said drive comprising at least one flangeless tape guide at either side of said head in said longitudinal direction and configured to position said longitudinal tape data storage medium in proximity with respect to said head; and a servo system configured to position said head laterally with respect to at least one defined servo track of longitudinal tape, comprising:

a servo sensor for sensing lateral position of said head with respect to at least one defined servo track of said longitudinal tape;

a fine actuator configured to translate said head laterally with respect to said longitudinal tape;

a coarse actuator configured to translate said fine actuator laterally with respect to said longitudinal tape; and a servo control configured to sense said servo sensor; to determine position error between said head and a desired position related to said at least one defined servo track; to provide signals to operate said fine actuator to translate said head laterally in a manner to reduce said determined position error; to sense from said provided signals, lateral shift excursion of said at least one defined servo track; and to operate said coarse actuator to position said coarse actuator substantially at a midpoint of said lateral shift excursion of said at least one defined servo track; wherein said tape is guided with respect to said head with said flangeless tape guides such that said lateral shift excursion is greater than a unidirectional stroke of said fine actuator, and wherein said servo system servo control is configured to operate said coarse actuator to position said coarse actuator such that said fine actuator is capable of reaching both sides of said lateral shift excursion of said at least one defined servo track.

21. A data storage drive comprising:
a head configured to record and read data on a longitudinal tape data storage medium;
a drive configured to move said longitudinal tape data storage medium in the longitudinal direction with respect to said head, said drive comprising at least one flangeless tape guide at either side of said head in said longitudinal direction and configured to position said longitudinal tape data storage medium in proximity with respect to said head; and
a servo system configured to position a head laterally with respect to at least one defined servo track of longitudinal tape, comprising:
  a servo sensor for sensing lateral position of said head with respect to at least one defined servo track;
  a fine actuator configured to translate said head laterally with respect to said longitudinal tape;
  a coarse actuator configured to translate said fine actuator laterally with respect to said longitudinal tape; and
  a servo control configured to sense said servo sensor; to determine lateral shift excursion of said longitudinal tape with respect to said head; to determine from said determined lateral shift excursion, a midpoint location of said determined lateral shift excursion of said longitudinal tape; and to operate said coarse actuator to position said coarse actuator substantially at said midpoint location.

22. The data storage drive of claim 21, additionally configured to store said determined midpoint location of said determined lateral shift excursion of said longitudinal tape; and associate said stored midpoint location with an identification of said longitudinal tape.

23. A data storage drive comprising:
a head configured to record and read data on a longitudinal tape data storage medium;
a drive configured to move said longitudinal tape data storage medium in the longitudinal direction with respect to said head, said drive comprising at least one flangeless tape guide at either side of said head in said longitudinal direction and configured to position said longitudinal tape data storage medium in proximity with respect to said head; and
a servo system configured to position a head laterally with respect to at least one defined servo track of longitudinal tape, comprising:
  a servo sensor for sensing lateral position of said head with respect to at least one defined servo track;
  a fine actuator configured to translate said head laterally with respect to said longitudinal tape;
  a coarse actuator configured to translate said fine actuator laterally with respect to said longitudinal tape; and
  a servo control configured to determine position error between said head and a desired position related to said at least one defined servo track, said determined position error comprising at least a DC component; to operate said fine actuator to translate said head laterally in a manner to reduce said determined position error; to determine a maximum positive value of said DC component of said position error signal; to determine a maximum negative value of said DC component of said position error signal; and to determine a midpoint location of said coarse actuator where said maximum positive value of said DC component and said maximum negative value of said DC component are substantially equal.

24. The data storage drive of claim 23, wherein said servo system servo control is additionally configured to maintain said coarse actuator at substantially said midpoint location; and to operate said position error signal loop and said fine actuator to reduce said position error signal loop determined position error.

25. The data storage drive of claim 23, wherein said servo system servo control is additionally configured to store said determined midpoint location of said coarse actuator; and to associate said stored midpoint location with an identification of said longitudinal tape.

* * * * *